United States Patent
Kim

(10) Patent No.: US 9,209,436 B2
(45) Date of Patent: Dec. 8, 2015

(54) SECONDARY BATTERY

(75) Inventor: Dukjung Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 803 days.

(21) Appl. No.: 13/294,987

(22) Filed: Nov. 11, 2011

(65) Prior Publication Data

US 2012/0202096 A1    Aug. 9, 2012

(30) Foreign Application Priority Data

Feb. 8, 2011   (KR) .................. 10-2011-0010943

(51) Int. Cl.
| | |
|---|---|
| *H01M 10/42* | (2006.01) |
| *H01M 2/04* | (2006.01) |
| *H01M 2/34* | (2006.01) |
| *H01H 35/34* | (2006.01) |
| *H01H 79/00* | (2006.01) |

(52) U.S. Cl.
CPC .......... *H01M 2/0426* (2013.01); *H01M 2/0473* (2013.01); *H01M 2/345* (2013.01); *H01H 35/34* (2013.01); *H01H 79/00* (2013.01); *H01M 2200/20* (2013.01)

(58) Field of Classification Search
CPC . H01M 2/0426; H01M 2/0473; H01M 2/345; H01M 2200/20; H01H 35/34; H01H 79/00
See application file for complete search history.

(56) References Cited

U.S. PATENT DOCUMENTS

| | | | |
|---|---|---|---|
| 2010/0075205 A1* | 3/2010 | Kwag et al. .................. | 429/61 |
| 2010/0233528 A1 | 9/2010 | Kim et al. | |
| 2010/0279156 A1 | 11/2010 | Kim et al. | |
| 2011/0039136 A1* | 2/2011 | Byun et al. .................. | 429/56 |
| 2011/0183193 A1 | 7/2011 | Byun et al. | |
| 2011/0183197 A1 | 7/2011 | Byun et al. | |
| 2012/0214030 A1* | 8/2012 | Guen .......................... | 429/61 |
| 2013/0011703 A1* | 1/2013 | Kim et al. .................... | 429/61 |

FOREIGN PATENT DOCUMENTS

| | | |
|---|---|---|
| EP | 0 773 595 A1 | 5/1997 |
| EP | 1 076 350 A2 | 2/2001 |
| KR | 1999-0018873 U | 6/1999 |
| KR | 10-2011-0005197 A | 1/2011 |
| KR | 10-1042808 B1 | 6/2011 |
| KR | 10-2011-0087567 | 8/2011 |
| KR | 10-2010-0102462 A | 9/2011 |

OTHER PUBLICATIONS

European Search Report dated Oct. 24, 2013 issued in EP 12152001, 7 pages.

* cited by examiner

*Primary Examiner* — Carlos Barcena
*Assistant Examiner* — Lilia V Nedialkova
(74) *Attorney, Agent, or Firm* — Christie, Parker & Hale, LLP

(57) ABSTRACT

A secondary battery including an electrode assembly including a first electrode plate, a second electrode plate, and a separator between the first and second electrode plates, a case configured to accommodate the electrode assembly, and a cap assembly configured to seal the case and including a cap plate having a short-circuit opening, a reversible plate at the short-circuit opening, an insulation member on the cap plate and including an open part at a side, and a short-circuit plate configured to be inserted into and coupled to the open part for covering the short-circuit opening.

14 Claims, 5 Drawing Sheets

SECONDARY BATTERY

CROSS-REFERENCE TO RELATED APPLICATION

This application claims priority to and the benefit of Korean Patent Application No. 10-2011-0010943 filed on Feb. 8, 2011, in the Korean Intellectual Property Office, the entire content of which is incorporated by reference herein.

BACKGROUND

1. Field

Embodiments of the present invention relate to a secondary battery.

2. Description of Related Art

Secondary batteries are rechargeable, unlike primary batteries. Among such secondary batteries, a low capacity battery including a battery cell in the form of a pack may be used for small portable electronic devices, such as cellular phones and camcorders, and a high capacity battery including dozens of battery cells connected to one another may be used as a motor-driving power source for electric scooters, hybrid vehicles, or electric vehicles.

Secondary batteries are manufactured in various shapes, such as a cylindrical shape and a prismatic shape. A secondary battery is constructed as follows: an electrode assembly, which is formed by placing an insulating separator between positive and negative electrode plates, is placed in a case together with electrolyte, and a cap plate is placed on the case. The electrode assembly is connected to positive and negative terminals, which protrude from the cap plate and are exposed to the exterior of the secondary battery.

SUMMARY

An aspect of embodiments according to the present invention provides a secondary battery having fewer components and reduced weight for simplifying manufacturing processes and improving the yield of the manufacturing processes.

According to at least one of the embodiments of the present invention, a secondary battery includes an electrode assembly including a first electrode plate, a second electrode plate, and a separator between the first and second electrode plates, a case configured to accommodate the electrode assembly, and a cap assembly configured to seal the case and including a cap plate having a short-circuit opening, a reversible plate at the short-circuit opening, an insulation member on the cap plate and including an open part at a side, and a short-circuit plate configured to be inserted into and coupled to the open part for covering the short-circuit opening.

The open part may include a bottom part contacting the cap plate and coupled to the cap plate, first and second sidewall parts extending upward from respective sides of the bottom part, and a cover part between the first and second sidewall parts.

The open part may have an inlet opening defined by the bottom part, the first and second sidewall parts, and the cover part, and the short-circuit plate may be inserted into the inlet opening and housed in the insulation member.

The insulation member may also include a receiving recess part at which the short-circuit plate inserted into the open part is at least partially placed.

The receiving recess part may include a bottom part, a first sidewall part, a second sidewall part, and a third sidewall part coupled to the bottom part, the first sidewall part, and the second sidewall part of the receiving recess part, and the bottom part and the first and second sidewall parts of the receiving recess part may extend from the bottom part, the first sidewall part, and the second sidewall part of the open part.

A terminal plate having a terminal penetration hole may be coupled to the short-circuit plate on the receiving recess part.

The bottom part of the open part may have a contact hole at a position corresponding to a position of the short-circuit opening.

The bottom part of the receiving recess part may have a first penetration hole.

The short-circuit plate may have a second penetration hole at a position corresponding to a position of the first penetration hole.

The secondary battery may also include first and second collecting terminals electrically coupled to the first and second electrode plates, respectively, and the first collecting terminal may be penetrates through the terminal penetration hole, the first penetration hole, and the second penetration hole.

The reversible plate may include a downwardly-convex round part, and an edge part coupled to the cap plate.

The reversible plate may be configured to be brought into contact with the short-circuit plate by an internal pressure in the secondary battery.

The reversible plate may be electrically coupled to the second electrode plate. The short-circuit plate may be electrically coupled to the first electrode plate.

BRIEF DESCRIPTION OF THE DRAWINGS

The accompanying drawings are included to provide a further understanding of the present invention, and are incorporated in and constitute a part of this application. The drawings illustrate exemplary embodiments of the present invention and, together with the description, serve to explain aspects of embodiments of the present invention.

In the drawings.

DETAILED DESCRIPTION

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the present invention to those skilled in the art.

Figure 1:
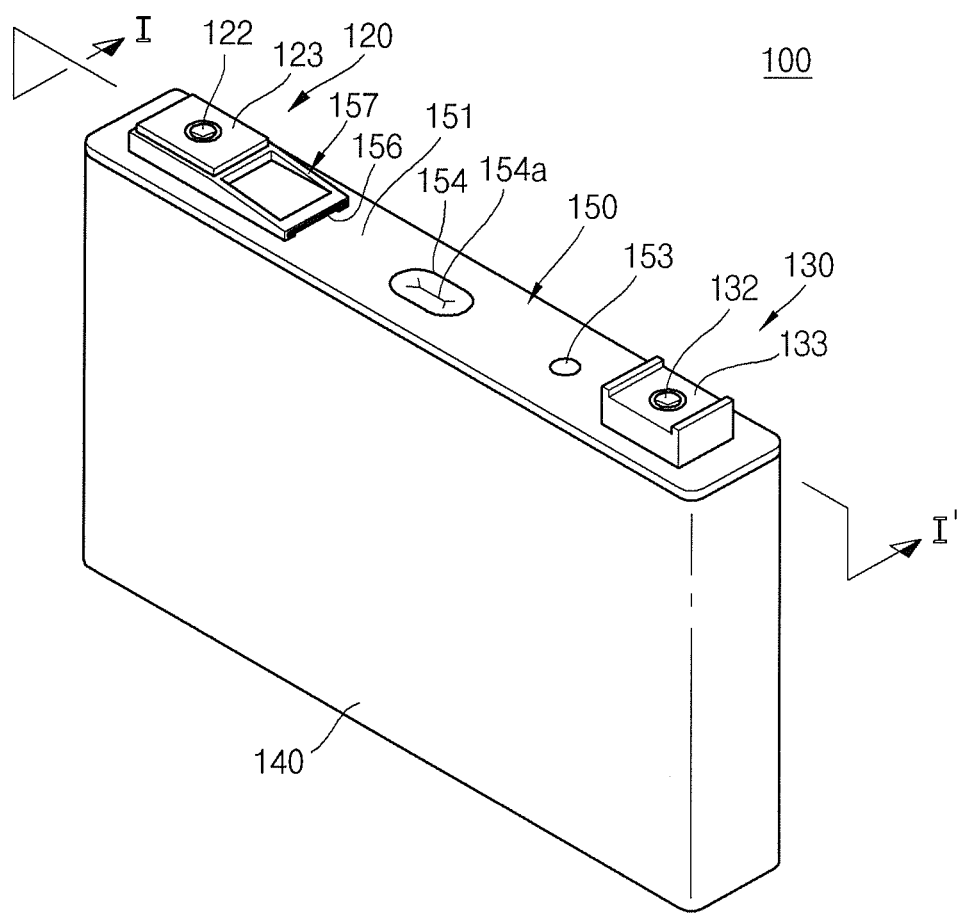
FIG. 1 is a perspective view illustrating a secondary battery according to an embodiment of the present invention.
Figure 2:
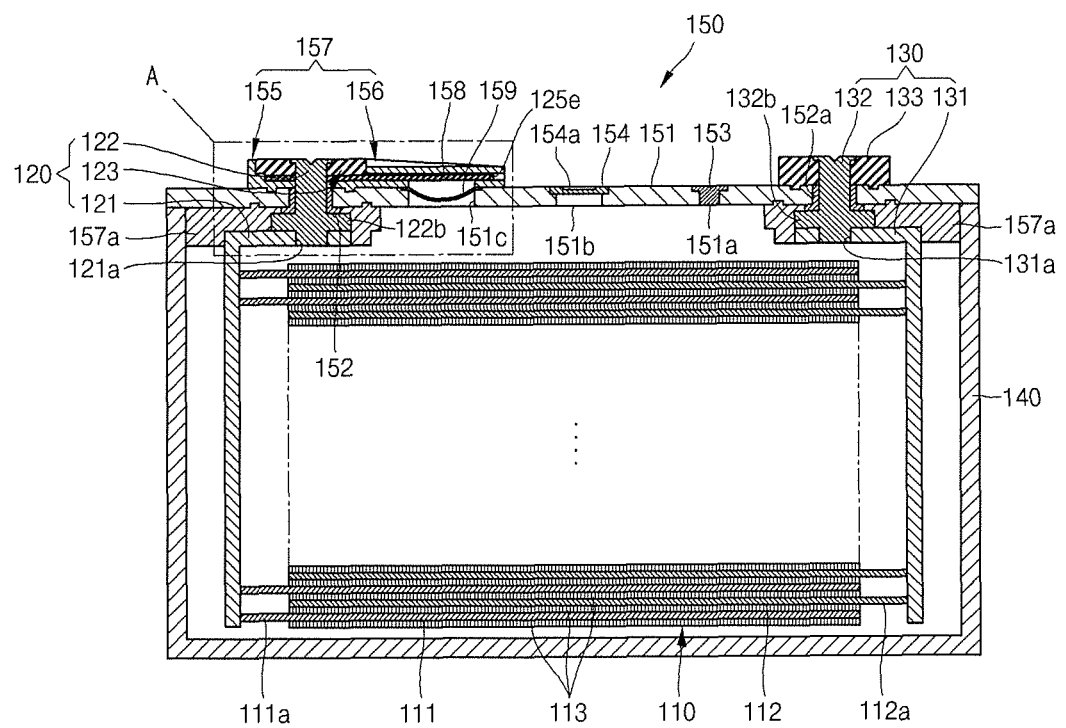
FIG. 2 is a sectional view of the secondary battery of the embodiment shown in FIG. 1, taken along the line I-I' of FIG. 1.
Figure 3:
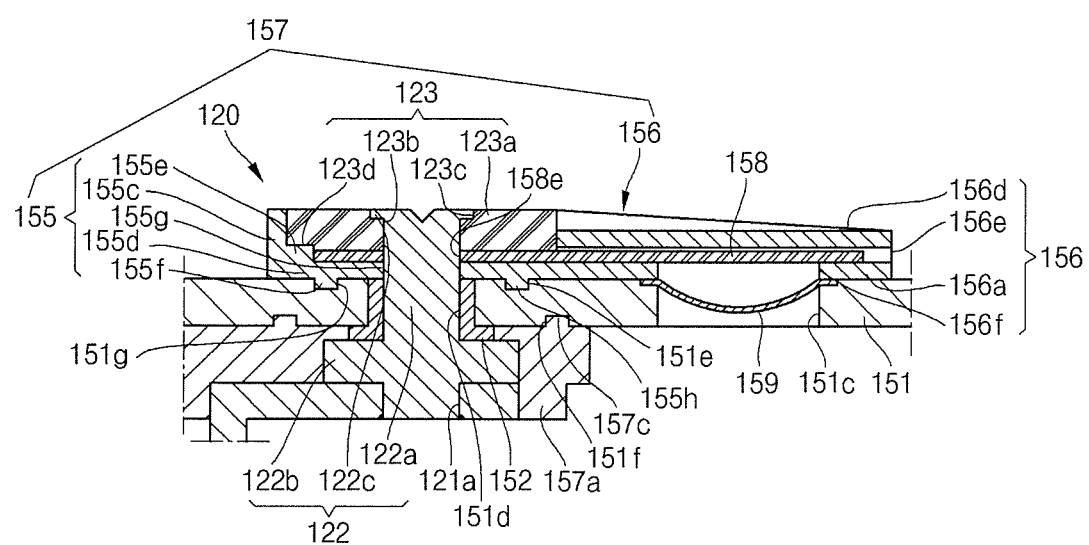
FIG. 3 is an enlarged sectional view illustrating portion A of FIG. 2.
Figure 4:
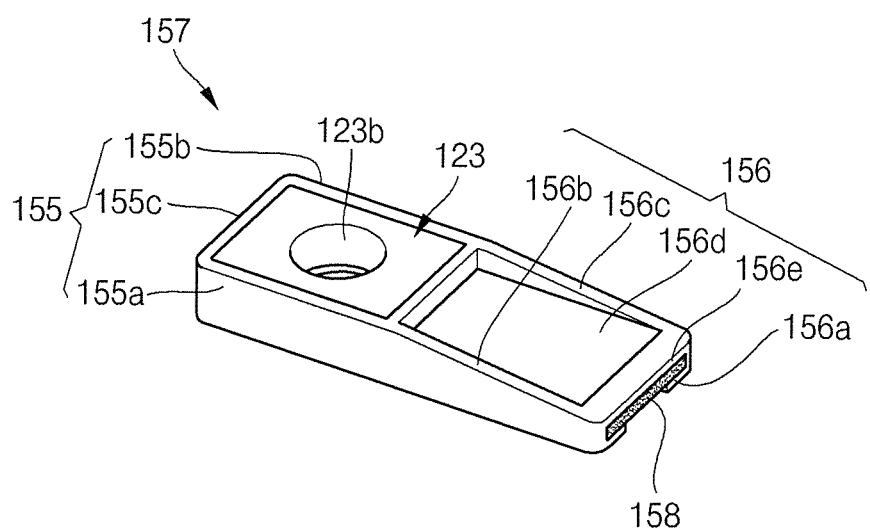
FIG. 4 is a perspective view illustrating an insulation member of the embodiment illustrated in FIG. 2.
Figure 5:
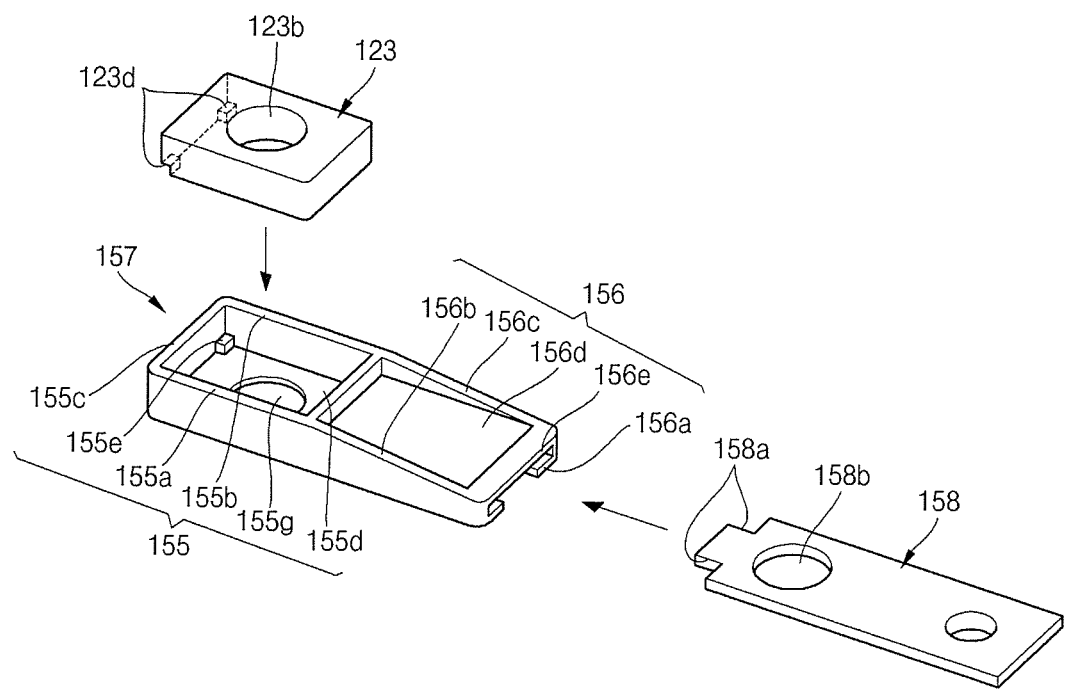
FIG. 5 is a perspective view illustrating a state where a short-circuit plate and a terminal plate are coupled to the insulation member of the embodiment illustrated in FIG. 2.

FIG. 1 is a perspective view illustrating a secondary battery according to an embodiment of the present invention. FIG. 2 is a sectional view of the embodiment of the secondary battery shown in FIG. 1, taken along the line I-I' of FIG. 1. FIG. 3 is an enlarged sectional view illustrating portion A of FIG. 2. FIG. 4 is a perspective view illustrating an insulation member of the embodiment illustrated in FIG. 2. FIG. 5 is a perspective view illustrating a state where a short-circuit plate and a terminal plate are coupled to the insulation member of the embodiment illustrated in FIG. 2.

Referring to FIGS. 1 through 5, a secondary battery 100 of the current embodiment includes an electrode assembly 110, a first terminal assembly 120, a second terminal assembly 130, a case 140, and a cap assembly 150. The electrode assembly 110 is formed by winding or stacking a first electrode plate 111, a separator 113, and a second electrode plate 112, each of which has a thin plate or film shape. The first electrode plate 111 may function as a negative electrode, and the second electrode plate 112 may function as a positive electrode. Alternatively, the first electrode plate 111 may function as the positive electrode and the second electrode plate 112 may function as the negative electrode.

The first electrode plate 111 is formed by applying a first electrode active material, such as graphite or carbon, to a first electrode collector formed of metal foil, such as copper or nickel foil. The first electrode plate 111 includes a first electrode non-coating portion 111a to which the first electrode active metal is not applied. The first electrode non-coating portion 111a functions as a current flow passage between the first electrode plate 111 and the outside of the first electrode plate 111. In the current embodiment, materials that can be used to form the first electrode plate 111 are not limited to the above-mentioned materials.

The second electrode plate 112 is formed by applying a second electrode active material, such as a transition metal oxide, to a second electrode collector formed of metal foil, such as aluminum foil. The second electrode plate 112 includes a second electrode non-coating portion 112a to which the second electrode active metal is not applied. The second electrode non-coating portion 112a functions as a current flow passage between the second electrode plate 112 and the outside of the second electrode plate 112. In the current embodiment, materials that can be used to form the second electrode plate 112 are not limited to the above-mentioned materials.

The first and second electrode plates 111 and 112 may change their polarities with each other.

The separator 113 may be located between the first electrode plate 111 and the second electrode plate 112 to prevent a short circuit and to allow movement of lithium ions. The separator 113 may be formed of a polyethylene film, a polypropylene film, or a film including polyethylene and polypropylene. In the current embodiment, materials that can be used to form the separator 113 are not limited to the above-mentioned materials.

The first and second terminal assemblies 120 and 130 are coupled to respective end parts of the electrode assembly 110 in a manner such that the first and second terminal assemblies 120 and 130 are electrically coupled to the first and second electrode plates 111 and 112, respectively.

The first terminal assembly 120 is usually formed of a metal or an equivalent thereof, and is electrically coupled to the first electrode plate 111. The first terminal assembly 120 includes a first collecting plate 121, a first collecting terminal 122, and a first terminal plate 123.

The first collecting plate 121 makes contact with the first electrode non-coating portion 111a protruding from an end of the electrode assembly 110. For example, the first collecting plate 121 may be welded to the first electrode non-coating portion 111a. The first collecting plate 121 has a generally reverse, or inverted, 'L' shape, and a first terminal hole 121a is formed in an upper portion thereof. The first collecting terminal 122 is fitted and coupled to the first terminal hole 121a. The first collecting plate 121 may be formed of one of copper, copper alloy, or an equivalent thereof. However, the material of the first collecting plate 121 is not limited thereto.

The first collecting terminal 122 penetrates a cap plate 151 and protrudes upward by a length (e.g., a predetermined length). The first collecting terminal 122 is electrically coupled to the first collecting plate 121 at a lower side of (e.g., a position below) the cap plate 151. For example, the first collecting terminal 122 may be formed of one of a copper alloy or an equivalent thereof. However, the material of the first collecting terminal 122 is not limited thereto.

In detail, the first collecting terminal 122 includes a first body 122a, a first flange 122b, and a first fixing part 122c.

The first body 122a includes an upper column protruding to an upper side of (e.g., a position above) the cap plate 151, and a lower column coupled to a lower portion of the upper column and extending to the lower side of (e.g., a position below) the cap plate 151.

The first flange 122b extends horizontally from a side part of the lower column of the first body 122a. The first flange 122b prevents the first collecting terminal 122 from being removed from the cap plate 151.

The first fixing part 122c extends horizontally from a side part of an end of the upper column constituting the first collecting terminal 122. The first fixing part 122c fixes the first collecting terminal 122 to the first terminal plate 123.

The first terminal plate 123 may have a generally rectangular box shape configured to couple with the first fixing part 122c. The first terminal plate 123 may include: a vertical terminal penetration hole (or a first collecting terminal hole 123b) at a center part so that the first collecting terminal 122 can be inserted in and coupled to the first terminal plate 123; a receiving recess (not shown) having a depth (e.g., a predetermined depth) so that the first fixing part 122c can be placed in the receiving recess. The first terminal plate 123 may include a first coupling body 123a, the first collecting terminal hole 123b, a first fixing recess 123c, and first coupling protrusion recesses 123d.

The first coupling body 123a makes contact with a receiving recess part 155 of an insulation member 157 (described later). The first coupling body 123a functions as a base so that the first terminal plate 123 can be stably placed on the insulation member 157.

The first collecting terminal hole 123b is formed from a top surface to a bottom surface of the first coupling body 123a to receive the upper column of the first collecting terminal 122.

The first fixing recess 123c may be formed at an upper end of the first coupling body 123a and has a diameter greater than that of the first collecting terminal hole 123b so that the first fixing part 122c can be placed on the first fixing recess 123c.

The first coupling protrusion recesses 123d are coupled to coupling protrusions 155e of the receiving recess part 155 in a manner such that the first coupling protrusion recesses 123d make tight contact with the coupling protrusions 155e.

Like the first terminal assembly 120, the second terminal assembly 130 is usually formed of a metal or an equivalent thereof, and is electrically coupled to the second electrode plate 112. The second terminal assembly 130 includes a second collecting plate 131, a second collecting terminal 132, and a second terminal plate 133. The second terminal assembly 130 may have substantially the same shape and structure as those of the first terminal assembly 120. Thus, descriptions thereof will not be repeated. The second collecting plate 131 and the second collecting terminal 132 may usually be formed of one of aluminum, an aluminum alloy, or an equivalent thereof. However, the current embodiment is not limited to such materials. The second terminal plate 133 may be formed of one of stainless steel, aluminum, aluminum alloy, copper, copper alloy, or an equivalent thereof. However, the current embodiment is not limited thereto.

In addition, the second terminal plate 133 may be electrically coupled to the cap plate 151. In this case, the case 140 and the cap plate 151 (that will be described below in detail) may have the same polarity as that of the second terminal assembly 130.

The case 140 may be formed of a conductive metal, such as aluminum, aluminum alloy, or steel plated with nickel. The case 140 accommodates the electrode assembly 110, the first collecting terminal 122, and the second collecting terminal 132. The inner surface of the case 140 may be treated so that the case 140 can be electrically insulated from the electrode assembly 110, the first and second terminal assemblies 120 and 130, and the cap assembly 150. The case 140 may have a polarity. For example, the case 140 may function as a positive electrode.

The cap assembly 150 is coupled to the case 140. In detail, the cap assembly 150 includes the cap plate 151, sealing gasket 152, a connection gasket 152a, a plug 153, a safety vent 154, the insulation member 157, lower insulation members 157a, a short-circuit plate 158, and a reversible plate 159.

The cap plate 151 closes an opening of the case 140. The cap plate 151 may be formed of the same material as that used to form the case 140. The cap plate 151 may include an electrolyte injection hole 151a, a vent hole 151b, a short-circuit opening 151c, and a collecting terminal hole 151d. In addition, the cap plate 151 may include a second protrusion recess 151e at an upper surface thereof, and coupling recesses 151f at a lower surface thereof. The cap plate 151 may be coupled to the case 140 by laser welding. The cap plate 151 may have the same polarity as that of the second electrode plate 112, the second collecting terminal 132, and the case 140.

The sealing gasket 152 is formed of an insulating material and are respectively located between the cap plate 151 and the first and second collecting terminals 122 and 132 to seal gaps between the cap plate 151 and the first and second collecting terminals 122 and 132. The sealing gaskets 152 prevent permeation of moisture into the secondary battery 100, as well as leakage of electrolyte from the inside of the secondary battery 100.

The connection gasket 152a is located at a position of the cap plate 151 through which the second collecting terminal 132 is inserted. The connection gasket 152a electrically couples the second collecting terminal 132 and the cap plate 151 while preventing permeation of moisture into the secondary battery 100 and leakage of electrolyte from the inside of the secondary battery 100.

The plug 153 closes the electrolyte injection hole 151a of the cap plate 151, and the safety vent 154 is located in the vent hole 151b of the cap plate 151. The safety vent 154 has a notch 154a so that the safety vent 154 can be opened at a suitable pressure (e.g., a set pressure).

The insulation member 157 is located on the cap plate 151 to electrically insulate the first collecting terminal 122 and the cap plate 151 from each other. The insulation member 157 is configured such that the short-circuit plate 158 can be inserted and coupled between the first terminal plate 123 and the cap plate 151 in a state where the first terminal plate 123 is placed on the short-circuit plate 158. For example, the insulation member 157 includes an open part 156 and the receiving recess part 155. The open part 156 includes an opening at a side.

The open part 156 includes a bottom part 156a, a first sidewall part 156b, a second sidewall part 156c, and a cover part 156d. An inlet opening (slit or hole) 156e is formed by the bottom part 156a, the first sidewall part 156b, the second sidewall part 156c, and the cover part 156d, and the short-circuit plate 158 can be inserted into the inlet opening 156e.

The receiving recess part 155 includes a bottom part 155d, a first sidewall part 155a, a second sidewall part 155b, and a third sidewall part 155c. The short-circuit plate 158 is inserted in the open part 156 and placed on the receiving recess part 155. The bottom part 155d, the first sidewall part 155a, and the second sidewall part 155b extend from the bottom part 156a, the first sidewall part 156b, and the second sidewall part 156c of the open part 156. The coupling protrusions 155e are located on the receiving recess part 155 in a manner such that the coupling protrusions 155e protrude upward at front corners of the short-circuit plate 158. The first terminal plate 123 is coupled to the short-circuit plate 158 that is inserted in the open part 156 and placed on the receiving recess part 155.

The bottom parts 155d and 156a make contact with the cap plate 151 as a base so that the insulation member 157 can be stably placed on the cap plate 151.

The first sidewall parts 155a and 156b, the second sidewall parts 155b and 156c, and the third sidewall part 155c extend upward from edges of the bottom parts 155d and 156a so that the first terminal plate 123 and the short-circuit plate 158 can be accommodated in the insulation member 157.

In the open part 156 of the insulation member 157, the cover part 156d is coupled between the first sidewall part 156b and the second sidewall part 156c to cover the short-circuit plate 158 inserted into the open part 156.

The top surface of the cover part 156d is parallel with the insertion direction of the short-circuit plate 158. The first sidewall part 156b and the second sidewall part 156c are formed in the form of reinforcement ribs. Therefore, the cover part 156d may support the short-circuit plate 158 without bending, and thus, unnecessary spaces may be reduced.

In addition, the insulation member 157 may include a first penetration hole 155g, a contact hole 156f, the coupling protrusions 155e, a first protrusion 155f, and a second protrusion 155h.

The first penetration hole 155g is formed through the bottom part 155d of the receiving recess part 155 so that the first collecting terminal 122 can be inserted through the first penetration hole 155g.

The contact hole 156f is formed in the bottom part 156a facing the cover part 156d of the open part 156 so that the reversible plate 159 (described later) can make contact with the short-circuit plate 158 through the contact hole 156f.

The coupling protrusions 155e are located at the bottom part 155d of the receiving recess part 155 in a manner such that the coupling protrusions 155e protrude upward at the front corners of the short-circuit plate 158.

The first protrusion 155f is located at the bottom surface of the bottom part 155d at a position close to the first penetration hole 155g. The first protrusion 155f is coupled to a first protrusion recess 151g formed in the cap plate 151.

The second protrusion 155h is located at the bottom surface of the bottom part 155d at a position close to the first penetration hole 155g. The second protrusion 155h is coupled to the second protrusion recess 151e formed in the cap plate 151.

The lower insulation members 157a are located between the cap plate 151 and the first collecting plate 121, and between the cap plate 151 and the second collecting plate 131, to prevent an unnecessary short circuit. In addition, coupling protrusions 157c may be located at a top surface of the lower insulation members 157a for coupling with the coupling recesses 151f of the cap plate 151.

Recesses 158a (shown in FIG. 5) are formed at an end of the short-circuit plate 158 so that the end of the short-circuit plate 158 can be inserted into the open part 156 and horizontally fitted between the coupling protrusions 155e. The recesses 158a have shapes corresponding to the shapes of the coupling protrusions 155e. Therefore, the recesses 158a of the short-circuit plate 158 are coupled to the coupling protrusions 155e of the receiving recess part 155 in tight contact with the coupling protrusions 155e.

In addition, the short-circuit plate 158 includes a second penetration hole 158b (shown in FIG. 5) at a position corresponding to the position of the first penetration hole 155g. The second penetration hole 158b is placed above the first penetration hole 155g and aligned with the first penetration hole 155g.

The short-circuit plate 158 may be electrically coupled to the first electrode plate 111 and have the same polarity as that of the first electrode plate 111.

The reversible plate 159 includes a downwardly-convex round part and an edge part fixed to the cap plate 151. The reversible plate 159 is located at the short-circuit opening 151c of the cap plate 151. The reversible plate 159 is electrically coupled to the second electrode plate 112. In one embodiment, for example, a positive potential is applied to the reversible plate 159 from the cap plate 151 having the same polarity as that of the second electrode plate 112. If the internal pressure of the secondary battery 100 increases (e.g., increases to be greater than a set value), the reversible plate 159 is reversed into an upwardly-convex shape toward the short-circuit plate 158 and is brought into contact with the short-circuit plate 158 having the same polarity (negative potential) as the first electrode plate 111. In this way, the reversible plate 159 causes a short circuit. That is, if the internal pressure of the secondary battery 100 increases (e.g., increases to be greater than a set value) due to generation of gas in the secondary battery 100, the reversible plate 159 can be easily brought into contact with the short-circuit plate 158 to cause a short circuit because the short-circuit plate 158 inserted in the open part 156 of the insulation member 157 is restrained from bending.

In addition, the contact hole 156f may be sized such that even an edge part of the reversible plate 159 can be brought into contact with the short-circuit plate 158. In this case, when the internal pressure of the secondary battery 100 increases (e.g., increases to be greater than a set value), since a larger area of the reversible plate 159 can be brought into contact with the short-circuit plate 158, a short circuit may be formed more rapidly between the reversible plate 159 and the short-circuit plate 158.

As described above, since the short-circuit plate 158 is coupled to the insulation member 157 by inserting the short-circuit plate 158 into the insulation member 157, the number of components and weight of the secondary battery 100 can be reduced, and the manufacturing processes of the secondary battery 100 can be simplified to increase the yield of the manufacturing processes. In addition, when a short circuit is induced because of overcharging or the like, bending of the short-circuit plate 158 can be prevented owing to the rigid insulation member 157.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention, which is intended to cover various modifications and equivalent arrangements included within the spirit and scope of the appended claims, and equivalents thereof.

What is claimed is:

1. A secondary battery comprising:
   an electrode assembly comprising a first electrode plate, a second electrode plate, and a separator between the first and second electrode plates;
   a case configured to accommodate the electrode assembly; and
   a cap assembly configured to seal the case and comprising:
      a cap plate having a short-circuit opening;
      a reversible plate at the short-circuit opening;
      an insulation member on the cap plate and comprising an open part at a side; and
      a short-circuit plate configured to be inserted into and coupled to the open part for covering the short-circuit opening,
   wherein the open part comprises:
      a bottom part contacting the cap plate and coupled to the cap plate; and
      first and second sidewall parts extending upward from respective sides of the bottom part, and
   wherein the first and second sidewall parts define an inlet opening facing away from the open part and along a direction substantially parallel to a length direction of the insulation member.

2. The secondary battery as claimed in claim 1, wherein the open part further comprises:
   a cover part between the first and second sidewall parts.

3. The secondary battery as claimed in claim 2, wherein the inlet opening is further defined by the bottom part and the cover part, and
   wherein the short-circuit plate is inserted into the inlet opening and housed in the insulation member.

4. The secondary battery as claimed in claim 1, wherein the insulation member further comprises a receiving recess part at which the short-circuit plate inserted into the open part is at least partially placed.

5. The secondary battery as claimed in claim 4, wherein the receiving recess part comprises:
   a receiving recess bottom part;
   a receiving recess first sidewall part;
   a receiving recess second sidewall part; and
   a receiving recess third sidewall part coupled to the receiving recess bottom part, the receiving recess first sidewall part, and the receiving recess second sidewall part of the receiving recess part,
   wherein the receiving recess bottom part, the receiving recess first sidewall part, and the receiving recess second sidewall part of the receiving recess part extend from the bottom part and the first and second sidewall parts of the open part.

6. The secondary battery as claimed in claim 4, wherein a terminal plate having a terminal penetration hole is coupled to the short-circuit plate on the receiving recess part.

7. The secondary battery as claimed in claim 6, wherein the bottom part of the open part has a contact hole at a position corresponding to a position of the short-circuit opening.

8. The secondary battery as claimed in claim 7, wherein the receiving recess part comprises a receiving recess bottom part having a first penetration hole.

9. The secondary battery as claimed in claim 8, wherein the short-circuit plate has a second penetration hole at a position corresponding to a position of the first penetration hole.

10. The secondary battery as claimed in claim 9, further comprising first and second collecting terminals electrically coupled to the first and second electrode plates, respectively,
wherein the first collecting terminal penetrates through the terminal penetration hole, the first penetration hole, and the second penetration hole.

11. The secondary battery as claimed in claim 9, wherein the reversible plate comprises:
a downwardly-convex round part; and
an edge part coupled to the cap plate.

12. The secondary battery as claimed in claim 11, wherein the reversible plate is configured to be brought into contact with the short-circuit plate by an internal pressure in the secondary battery.

13. The secondary battery as claimed in claim 12, wherein the reversible plate is electrically coupled to the second electrode plate.

14. The secondary battery as claimed in claim 12, wherein the short-circuit plate is electrically coupled to the first electrode plate.

\* \* \* \* \*